Oct. 15, 1929.   E. VIDEN   1,731,758
BEARING
Filed June 4, 1928

INVENTOR
ERIK VIDEN
Attorney

Patented Oct. 15, 1929

1,731,758

UNITED STATES PATENT OFFICE

ERIK VIDEN, OF CANWOOD, SASKATCHEWAN, CANADA

BEARING

Application filed June 4, 1928. Serial No. 282,863.

This present invention relates to new and useful improvements in bearings and has for its primary object the provision of an improved and simplified bearing structure for crank shafts, wrist pins and the like whereby the life and efficiency thereof are increased and prolonged with the bearing surface thereof always true.

Another object of the invention resides in the provision of bearings of the character stated including a replaceable bearing sleeve removably mounted on a crank shaft, wrist pin or the like so that the bearing surface may be kept true at all times without the necessity of grinding and reducing the diameter of the crank shaft, wrist pin or the like or otherwise repairing the same, due to the wear on or injury to the same.

A further object of the invention resides in the provision of a bearing structure of the character stated which is composed of the minimum number of parts, may be readily secured on the crank shaft, or the like and held in position by sectional collars around the ends thereof and securely fastened to the support from which the bearing portion of the crank shaft or the like is extended.

A still further object of the invention resides in the provision of a bearing structure of the character stated which is of such construction that it may be readily applied or removed and when in use will save the bearing or working face of the member on which it is mounted.

A still further object of the invention resides in the provision of a bearing structure of the character stated which includes a bearing sleeve formed of longitudinal sections each of which is adapted to be held against rotation on the crank shaft or other member on which it is mounted while a sectional collar is removably mounted on the end of the sectional bearing member to retain the latter in position on the crank shaft or the like.

A still further object of the invention resides in the provision of a bearing structure of the character stated which is composed of the minimum number of parts, of simple and inexpensive construction and arrangement and all of which may be readily assembled and secured in place or removed as desired.

To the accomplishment of these and related objects as shall become apparent as the description proceeds, my invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure, wherein like characters indicate like parts throughout the several views.

In the drawings:—

Figure 1:
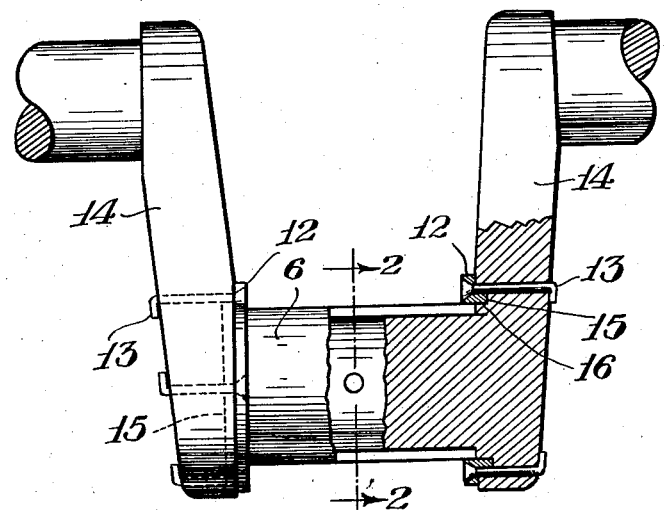
Figure 1 is an elevation of a conventional crank shaft with my improved bearing structure applied thereto, parts being shown in section for the sake of clearness.
Figure 2:
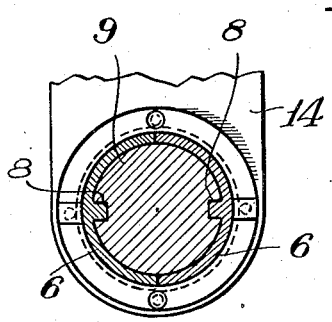
Figure 2 is a transverse section substantially on the plane of line 2—2 of Figure 1, looking in the direction indicated by the arrows.
Figure 3:
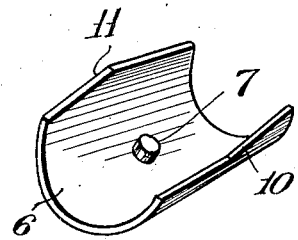
Figure 3 is a detail perspective of one section of the flexible bearing sleeve of the improved bearing structure.
Figure 4:
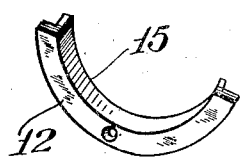
Figure 4 is a detail perspective of one section of the sectional mounting rings or collars for the bearing sleeve.

Referring more in detail to the drawings, it will be noted that the bearing structure includes a sectional bearing sleeve composed of two or more longitudinal sections 6 which are of arcuate form in cross section and each of which carries a central lug 7 on its inner face adapted to enter and rest in a socket 8 provided therefor in the working or bearing face of the crank shaft 9, wrist pin or other member on which the sleeve is mounted. Each sleeve section 6 has one longitudinal edge cut to form a V-shaped recess 10 therein, while the other longitudinal edge 11 is cut oppositely to provide a substantially V-shaped extension, so that the longitudinal edges of the sleeve sections 6 will interlock when the sleeve sections are in proper position on the crank shaft 9 or other member.

In order to firmly retain the sectional sleeve on the member 9, a sectional collar or ring is provided at one or both ends thereof with the collar or ring sections 12 encircling the sleeve and held in place by attaching members 13 passed therethrough and through the supporting member or members 14 at the ends of the bearing member 9 and from which the latter extends. The attaching members 13 may be headed on their inner ends and counter sunk in the collar or ring members 12 while their outer ends are turned or headed after being passed through the respective collar or ring sections 12 and the members 14. It is also to be noted that each ring section 12 has an annular outwardly directed flange 15 at a right angle thereto and which is adapted to be received in the circular channel 16 in the inner face of the member 14 to which the collar or ring sections 12 are secured.

As the construction of the device has thus been described in detail, brief reference is now had to its use and modus operandi: The bearing sleeve sections 6 are placed in position on the crank shaft or other member 9 with their oppositely cut and opposed longitudinal edges 10 and 11 in interlocking engagement and the lugs 7 resting in the sockets 8. The collar or ring sections 12 are then placed in position on the end or ends of the sleeve sections 6 and secured in place by the attaching members 13. Thus, the sectional bearing sleeve is firmly held in proper position on the member 9 to present a smooth and symmetrical outer bearing face to take the wear from any member operating thereon and thus prevent uneven wearing of or injury to the face of the member 9. Whenever the bearing sleeve is worn or damaged so as to interfere with efficient functioning thereof, the affected section or sections 6 may be readily removed and replaced at very little expense and in the minimum period of time. Furthermore, the operation of removing and replacing the bearing sleeve sections is very simple and may be performed by an ordinary mechanic without special training and expensive equipment.

From the foregoing description taken in connection with the accompanying drawings, it will be manifest that bearings are provided that will fulfill all the necessary requirements of such a device but as many changes could be made in the above description and many apparently widely different embodiments of my invention may be constructed within the scope of the appended claims without departing from the spirit or scope thereof, it is intended that all matters contained in the said accompanying specification and drawings, shall be interpreted as illustrative and not in a limited sense.

Having thus described my invention, what I claim as new and desire to secure by Letters Patent is:—

1. A bearing structure including a bearing sleeve formed of longitudinal sections having their opposed edges formed for interlocking engagement; each of said sections carrying means to prevent movement thereof on the bearing member on which the sleeve is mounted; and means encircling the end of the sectional sleeve and secured to the support for the bearing member to firmly retain the said sectional bearing sleeve in position on the bearing member.

2. A bearing structure including a sectional bearing sleeve adapted to be non-rotatably mounted on a bearing member; and flanged sectional collars encircling the ends of said bearing sleeve and attached to the supports for said bearing member; the flanges of said sectional collars resting in continuous grooves in said supports.

In testimony whereof I hereunto affix my signature.

ERIK VIDEN. [L. S.]